US012711816B2

(12) United States Patent
Jacquo et al.

(10) Patent No.: US 12,711,816 B2
(45) Date of Patent: Aug. 18, 2026

(54) TECHNIQUES FOR CLOUD-BASED CAPTURING AND REPLAYING OF COLLECTED VEHICLE DATA

(71) Applicant: FCA US LLC, Auburn Hills, MI (US)

(72) Inventors: Jonah Jacquo, Auburn Hills, MI (US); Lucas Romero, Auburn Hills, MI (US); William Keegan, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 57 days.

(21) Appl. No.: 18/787,164

(22) Filed: Jul. 29, 2024

(65) Prior Publication Data

US 2026/0030931 A1 Jan. 29, 2026

(51) Int. Cl.

*G07C 5/00* (2006.01)
*G07C 5/08* (2006.01)
*H04L 67/10* (2022.01)

(52) U.S. Cl.

CPC ........... *G07C 5/008* (2013.01); *G07C 5/0808* (2013.01); *H04L 67/10* (2013.01)

(58) Field of Classification Search

CPC ........ G07C 5/008; G07C 5/0808; H04L 67/10
USPC .......................................................... 701/31.4
See application file for complete search history.

(56) References Cited

U.S. PATENT DOCUMENTS 11,405,462 B1 * 8/2022 Puchalski ........... H04L 63/1425
12,444,240 B2 * 10/2025 Hutchins .............. G07C 5/0808
12,468,964 B2 * 11/2025 Singh ..................... G06N 5/046
2017/0330396 A1 * 11/2017 Yehezkel ............. G07C 5/0808
2020/0153752 A1 * 5/2020 Chan ..................... G06F 16/958
2020/0226225 A1 * 7/2020 Zaytsev ................ G01M 17/00
2020/0294401 A1 9/2020 Kerecsen
2021/0027554 A1 * 1/2021 Leonov .................. B62J 50/225
2023/0316817 A1 * 10/2023 Fang .................... G07C 5/0816 709/217
2023/0343145 A1 * 10/2023 Ghalami .............. G07C 5/0816
2023/0376803 A1 * 11/2023 Thakre .................... H04L 67/12
2024/0185648 A1 * 6/2024 Tzamaloukas .......... H04L 67/12
2024/0329964 A1 * 10/2024 Mesde ....................... G06F 8/60
2024/0403519 A1 * 12/2024 Devine ................... G06F 30/27

FOREIGN PATENT DOCUMENTS

CN 105929815 A 9/2016
CN 110794810 A 2/2020
CN 113343617 A 9/2021

* cited by examiner

*Primary Examiner* — Tyler D Paige
(74) *Attorney, Agent, or Firm* — Jeremy J. Klobucar

(57) ABSTRACT

A cloud-based vehicle data capture and replay system and method each involve a controller of an original equipment manufacturer (OEM) vehicle, the controller being configured to monitor and collect vehicle data including real-time signals indicative of operating conditions of the OEM vehicle and an OEM computing server configured to receive, from the OEM vehicle, the collected vehicle data for the OEM vehicle, store the collected vehicle data for the OEM vehicle, and in response to a request, replay the collected vehicle data for the OEM vehicle by distributing the collected vehicle data in a cloud-based OEM communication network, wherein the distribution of the collected vehicle data for the OEM vehicle in the cloud-based OEM communication network appears as if the OEM vehicle is operating in real-time.

20 Claims, 3 Drawing Sheets

TECHNIQUES FOR CLOUD-BASED CAPTURING AND REPLAYING OF COLLECTED VEHICLE DATA

FIELD

The present application generally relates to real-time vehicle data and, more particularly, to techniques for cloud-based capturing and replaying of collected real-time vehicle data.

BACKGROUND

During real-time operation of a vehicle (i.e., powered-up and operating in an on-road environment), the vehicle is continuously monitoring a plurality of signals. In some cases, an original equipment manufacturer (OEM) of the vehicle has a remote OEM computing server that is configured to receive such collected data from a plurality of OEM vehicles. This collected data is typically processed and manipulated at the OEM computing server for various reasons/uses, and thus the original data (as it came from the OEM vehicles) is no longer the same. OEM ("in-house") and third-party vehicle software application developers require and utilize real-time vehicle data for testing and verification, but this requires actual OEM vehicles operating on-road and in real-time. In many cases, OEM vehicles are hard to access for such software application testing/verification purposes. Accordingly, while such conventional vehicle data collection and software application testing/verification techniques do work for their intended purpose, there exists an opportunity for improvement in the relevant art.

SUMMARY

According to one example aspect of the invention, a cloud-based vehicle data capture and replay system is presented. In one exemplary implementation, the cloud-based vehicle data capture and replay system comprises a controller of an original equipment manufacturer (OEM) vehicle, the controller being configured to monitor and collect vehicle data including real-time signals indicative of operating conditions of the OEM vehicle and an OEM computing server configured to receive, from the OEM vehicle, the collected vehicle data for the OEM vehicle, store the collected vehicle data for the OEM vehicle, and in response to a request, replay the collected vehicle data for the OEM vehicle by distributing the collected vehicle data in a cloud-based OEM communication network, wherein the distribution of the collected vehicle data for the OEM vehicle in the cloud-based OEM communication network appears as if the OEM vehicle is operating in real-time.

In some implementations, the OEM computing server is configured to store a raw, unprocessed or non-manipulated version of the collected vehicle data for the OEM vehicle. In some implementations, the OEM computing server is further configured to execute a playback engine that retrieves the stored collected vehicle data and distributes it in a same sequence and timing that it was originally received from the OEM vehicle. In some implementations, the request is received by the OEM computing server and the collected vehicle data for the OEM vehicle is distributed in the cloud-based OEM communication network during a period where the OEM vehicle is not operating.

In some implementations, the request is provided by an OEM developer for the purpose of testing and/or verifying a vehicle software application using the collected vehicle data for the OEM vehicle. In some implementations, the request is provided by a third-party developer for the purpose of testing and/or verifying a vehicle software application using the collected vehicle data for the OEM vehicle. In some implementations, the third-party developer does not have access to the OEM vehicle or another OEM vehicle. In some implementations, the OEM computing server is configured to distribute the collected vehicle data for the OEM vehicle via one of (i) an OEM application program interface (API) and (ii) an OEM web-based platform.

According to another example aspect of the invention, a cloud-based vehicle data capture and replay method is presented. In one exemplary implementation, the method comprises monitoring and collecting, by a controller of an OEM vehicle, vehicle data including real-time signals indicative of operating conditions of the OEM vehicle, receiving, by an OEM computing server and from the OEM vehicle, the collected vehicle data for the OEM vehicle, storing, by the OEM computing server, the collected vehicle data for the OEM vehicle, and in response to a request, replaying, by the OEM computing server, the collected vehicle data for the OEM vehicle by distributing the collected vehicle data in a cloud-based OEM communication network, wherein the distribution of the collected vehicle data for the OEM vehicle in the cloud-based OEM communication network appears as if the OEM vehicle is operating in real-time.

In some implementations, the storing of the collected vehicle data comprises storing a raw, unprocessed or non-manipulated version of the collected vehicle data for the OEM vehicle. In some implementations, the method further comprises executing, by the OEM computing server, a playback engine that retrieves the stored collected vehicle data and distributes it in a same sequence and timing that it was originally received from the OEM vehicle. In some implementations, the request is received by the OEM computing server and the collected vehicle data for the OEM vehicle is distributed in the cloud-based OEM communication network during a period where the OEM vehicle is not operating.

In some implementations, the request is provided by an OEM developer for the purpose of testing and/or verifying a vehicle software application using the collected vehicle data for the OEM vehicle. In some implementations, the request is provided by a third-party developer for the purpose of testing and/or verifying a vehicle software application using the collected vehicle data for the OEM vehicle. In some implementations, the third-party developer does not have access to the OEM vehicle or another OEM vehicle. In some implementations, the distribution of the collected vehicle data for the OEM vehicle is performed by the OEM computing server via one of (i) an OEM API and (ii) an OEM web-based platform.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

Figure 1:
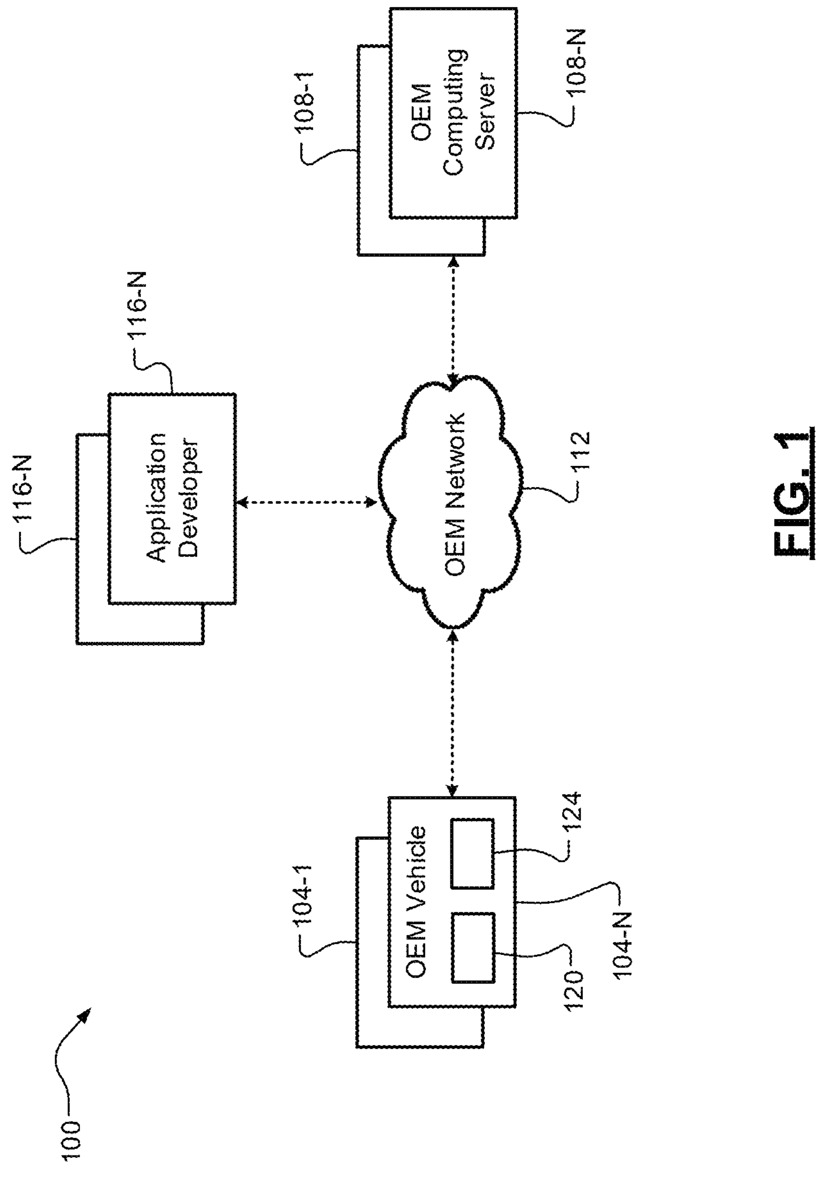
FIG. 1 is a functional block diagram of an example cloud-based vehicle data capture and replay system according to the principles of the present application.

As previously discussed, original equipment manufacturer (OEM) and third-party vehicle software application developers require and utilize real-time vehicle data for testing and verification, but this requires actual OEM vehicles operating on-road and in real-time. In many cases, OEM vehicles are hard to access for such software application testing/verification purposes, particularly for third-party or remote/global developers. Accordingly, techniques for cloud-based capturing and replaying of collected vehicle data for improved vehicle software application development (testing, validation, etc.) are presented herein. These techniques represent a novel approach to replaying data collected from an OEM vehicle in the cloud. The techniques provide for collecting data being streamed from OEM vehicles and recording it in real-time. These recording(s) can then be played back in the cloud and behaves (or appears to other entities) the exact same way that the actual OEM vehicle would. This allows OEM ("in-house") and third-party vehicle software application developers to test client applications using this data or to interpret real OEM vehicle data without needing an actual OEM vehicle.

In one embodiment, this solution makes use of an All Data App (ADA) client application on the OEM vehicles. The system, also referred to herein as a "Vehicle Cloud Recorder" or "VCR," intercepts data coming back to the cloud and stores it in raw form for playback. It will be appreciated that the ADA client application is one example vehicle data collection mechanism and that the VCR feature could utilize any suitable vehicle data collection mechanism. The playback mechanism provides for simulating the data coming from an OEM vehicle in the same way that one would playback an audio or video file. When an OEM vehicle is sending data to the cloud, the data is also sent to a cloud-based datastore (e.g., at a remote OEM computing server). Once the data is placed in the datastore, it can then be requested (e.g., queried by date/time) for efficient, on-demand replay. The selected data is then sent to a playback engine, which processes the dataset and sends the data to an OEM vehicle data processor at the same time interval that it was received from the OEM vehicle. This provides an authentic simulation of a live vehicle data stream. This invention removes the dependence on physical OEM vehicles to test, develop, and analyze vehicle software applications using real-world OEM vehicle data streams.

Conventional or existing solutions include (i) vehicle data logging and replay systems, (ii) cloud-based data pipelines, (iii) simulation environments, and (iv) general-purpose logging frameworks. The vehicle data logging and replay systems are localized to the vehicle itself, without cloud infrastructure. They also do not focus on data replay abilities. In contrast, the present invention prioritizes seamless recording and accurate replay of data streams. Cloud pipelines lack specialization for vehicle data streams. They do not maintain the precise sequencing needed for accurate replay. Simulation environments generate synthetic data rather than leveraging real vehicle data. Their modeling may be insufficiently realistic. In contrast, the present invention leverages real-world data for greater accuracy and realism. Existing frameworks also tend to be general purpose requiring customization. For example, logging frameworks, such as Logstash, require significant configuration to optimize vehicle data. They also do not inherently support timing precision. In contrast, the present invention is a purpose-built system optimized specifically for vehicle data streams. Integration with current vehicle data systems is limited in existing approaches. In contrast, the present invention leverages existing on-vehicle apps for tighter integration and improved adoption. Playback precision with respect to timing and sequencing is also not a core focus of other solutions. In contrast, the present invention uniquely emphasizes perfectly mimicking actual data streams.

In summary, the core differentiation is the cloud-based recording and replay abilities designed specifically around recreating precise real-world vehicle data streams. This focused approach solves the access problem in a more tailored way.

Referring now to FIG. 1, a functional block diagram of an example cloud-based vehicle data capture and replay system 100 (also "system 100") according to the principles of the present application is illustrated. The system 100 generally comprises a plurality of OEM vehicles 104-1 . . . 104-N (N being an integer greater than one, collectively "OEM vehicles 104"), one or more OEM computing servers 108-1 . . . 108-M (M being an integer greater than or equal to one, collectively "OEM computing servers 108"), and one or more OEM or third-party software application developers 116-1 . . . 116-M (collectively "application developers 116) all in communication via a cloud-based OEM communication network 112 (e.g., a cellular data network). For simplicity and improved descriptive purposes, only one OEM vehicle 104, one OEM computing server 108, and one application developer 116 may be referenced at a given time in describing the interaction of each entity as part of the system 100.

Each OEM vehicle 104 could be, for example, a passenger automobile manufactured and sold by the OEM and each can further include at least one controller or control system 120 that receives measurements/signals from a plurality of sensors or other systems 124. The OEM vehicle 104 is configured to collect this data, indicative of operating conditions of the OEM vehicle 104, in real-time while it is powered-up and operating in an on-road environment. The OEM vehicle 104 is configured to communicate with the OEM computing server 108 via the network 112. The computing server 108 is configured to receive the collected vehicle data from some or all of the OEM vehicles 104 and to store the raw/unaltered collected vehicle data in a separate memory or datastore. The computing server 108 is also configured to replay the collected vehicle data in an efficient, on-demand manner (e.g., in response to a request) by distributing the collected vehicle data via the network 112. This could include, for example, distributing the collected vehicle data to the application developer 116 via the network 112 in response to a request therefrom, which is described in greater detail below.

Figure 2:
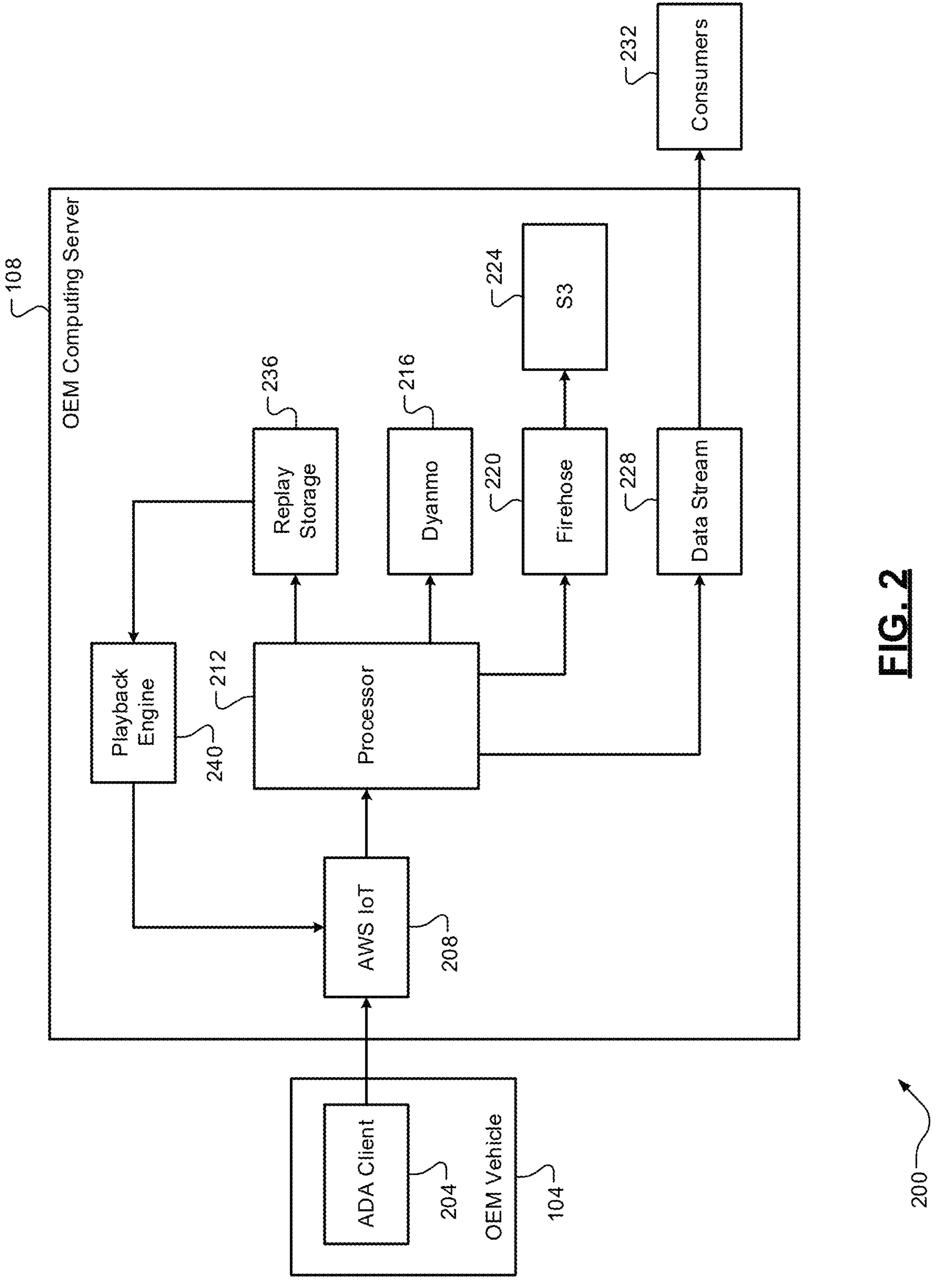
FIG. 2 is a functional block diagram of an example vehicle-side architecture for the cloud-based vehicle data capture and replay system according to the principles of the present application.

Referring now to FIG. 2, a functional block diagram of an example vehicle-side architecture 200 for the cloud-based vehicle data capture and replay system 100 (system 100) according to the principles of the present application is illustrated. As shown, the ADA client application 204 executing on each OEM vehicle 104 is configured to collect and transmit collected vehicle data to the OEM computing server 108 and, more particularly, to a receiving block such as an Amazon® Web Services or AWS® Internet-of-Things (IoT) block 208. This collected vehicle data could be transmitted from the OEM vehicle 104 to the OEM computing server 108 using an encrypted communication protocol, such as an encrypted vehicle-to-cloud (V2C) communication protocol. For example, the collected vehicle data could be transmitted in a message queuing telemetry transport (MQTT) protocol or another suitable protocol or message format. The operation of the ADA client application 204 and, more particularly, its configuration and process of collecting the real-time vehicle data, will now be described in greater detail.

Conventional systems for V2C communication are limited by the fact that they are typically tailored by OEM and designed to support only a predefined set of features and capabilities, which are not easily expandable. While minor updates can be delivered over-the-air (OTA), this OTA update process is slow and takes months to prepare and deploy once additional capabilities have been developed. As a result, OEM vehicle owners typically see only one or two updates per year at best, with some taking years before they are deployed. This lack of flexibility can limit the ability of vehicles to adapt to changing customer needs and market demands. For example, one traditional approach to vehicle management relies on a centralized cloud infrastructure to manage communication between the vehicle and the cloud. However, this approach has several limitations that can affect the flexibility and capabilities of the system. For instance, it may not be able to control various in-vehicle components and functions remotely, which means drivers must rely on manual controls or physical buttons to access certain features. This can increase driver distraction and reduce convenience.

Moreover, this traditional approach lacks the ability to personalize the driving experience based on individual preferences and needs. Drivers may have to settle for a one-size-fits-all solution that does not consider their unique requirements. This can lead to dissatisfaction with the system and reduce overall user engagement. The main drawback of having a bespoke designed approach for developing individual applications that communicate with back-end servers by the OEM is that it requires significant time and resources to develop, test, validate, and deploy new applications. This can result in delays in getting new features or updates to customers, which can negatively impact on their experience with the product. Furthermore, if there are any issues with the application or back-end servers, it may require significant time and effort to diagnose and fix the problem, which can further delay updates and negatively impact customer satisfaction. This approach also limits flexibility, as changes to the system may require re-coding and testing of all applications that communicate with the backend server. The disadvantages to single-purpose, inflexible applications can be limiting as they are designed specifically for one function and cannot easily adapt to changing requirements or new features.

A first disadvantage is high development costs. Developing custom vehicle software applications requires significant investment in terms of time, resources, and expertise. This can make it expensive to develop and maintain such applications. A second disadvantage is longer development times. Custom vehicle software applications typically require more time to develop compared to off-the-shelf solutions. This means that the time-to-market for new features or updates may be longer than desired. A third disadvantage is limited scalability. Bespoke vehicle software applications are often designed specifically for a particular use case or set of requirements. As such, they may not be easily adaptable to changing needs or scaled up to support larger user bases. A fourth disadvantage is vendor lock-in. In other words, when OEMs rely on bespoke solutions, they become dependent on the vendor who developed them. This can make it difficult to switch vendors or adopt new technologies in the future. A fifth disadvantage is increased risk of security vulnerabilities. Custom vehicle software applications are often more complex and may have more potential entry points for hackers. As a result, they may be at greater risk of security breaches compared to off-the-shelf solutions that have been extensively tested and validated by third-parties.

Overall, while bespoke solutions can offer unique benefits in terms of flexibility and customization, they also come with significant costs and risks that should be carefully considered before adopting such an approach. In contrast, a more standardized approach using industry-standard protocols and application program interfaces (APIs) can enable faster development and deployment of new features and updates, as well as easier integration with third-party services and applications. This can also reduce costs associated with developing custom solutions and improve overall scalability and flexibility of the system. The ADA client 204 is a cutting-edge feature that enables the control and management of various settings and functions of the OEM vehicle 104 using its controller 120 (e.g., an electronic control unit, or ECU) installed in the vehicle. The controller 120 collects data from different sensors and systems 124 within each respective OEM vehicle 104, such as engine/motor performance, fuel consumption, speed, and location, and processes it on-board according to predefined logic contained in a policy that is sent to the vehicle via the cloud infrastructure.

The novelty of this ADA client 204 is a unique feature of flexibility, which allows for the creation of new services that may not have been initially thought of during initial vehicle development. The system's design is such that it can collect and control various aspects of the vehicle, making it possible to combine different components to create innovative solutions. This means that as technology advances or new needs arise, the system can be easily adapted to meet those requirements without requiring significant changes to the underlying infrastructure. Overall, this flexibility makes the remote vehicle management application/system a highly versatile and valuable tool for businesses and individuals alike. Based on this logic and parameters defined in the policy, the application installed on the ECU configures itself, processes signals from various systems within the car, transmits data off-board to the cloud back end for further processing or analysis, and provides additional features that you may opt-in for as a customer. For example, if you have enabled the geofencing feature, the application will use the GPS coordinates to create virtual boundaries and alert you when the vehicle crosses these boundaries. Similarly, if you have activated the speed limit notification feature, the application will notify you when you exceed the predefined speed limit set in the policy.

Overall, the ADA client application 204 is a powerful tool that provides real-time insights into the OEM vehicle's performance and enables the management of its settings and functionality from anywhere at any time, making driving more convenient and safer. This system is also designed to be scalable, meaning that it can adapt to changing customer needs over time. As new technologies emerge or as you add more features to your vehicle, the application can be updated accordingly to ensure that everything works seamlessly together. The on-board ADA client application 204 uses polling, on demand, and scheduling methods to collect data from vehicles. Polling is the default method where any time the vehicle is on, it will collect data according to its policy. On-demand allows a policy to be execute the data collection once and sends back packet immediately. Scheduling allows a policy to be set to “auto on demand” for first vehicle check in. The ability of the ADA client 204 to send both predefined and dynamically generated policies on demand allows for great flexibility in managing vehicles. While a vehicle is already executing other features, new policies can be sent to it that interact with, control, or actuate different parts of the vehicle. These policies can work together or independently of each other, making the system highly adaptable to changing needs and situations.

For an ADA-based implementation of the VCR feature, the main elements of a versatile vehicle administration framework comprises three fundamental segments—the ADA client 204 (in-vehicle application), an ADA Web Portal (not explicitly shown), and an ADA Server 108 (cloud foundation backend). The ADA client’s containerized design allows it to be easily deployed on different ECUs within a vehicle to collect data. By using this feature, ADA’s client code can be reused when deploying to existing vehicle modules or new modules that are in development on new vehicle programs. This “write once, deploy everywhere” approach is one of the key reasons why ADA works so well as a flexible vehicle management system. It reduces the time and effort required to expand the system to create new functionality, making it easier for developers to quickly adapt to changing requirements and deliver high-quality products to customers. Additionally, this approach ensures that the code remains consistent across all ECUs in the vehicle, reducing the risk of errors or compatibility issues. Overall, ADA’s containerized design is a powerful tool for streamlining development and improving the efficiency of vehicle management systems.

The emerging trend towards more flexible and expandable systems allows for faster and more frequent updates. One approach involves using software platforms that can be easily customized by third-party developers and integrators. This allows for a wider range of features and capabilities to be added to the vehicle over time, without requiring costly and time-consuming redevelopment by the OEM. Another promising development is the use of cloud-based software platforms that can support real-time updates and dynamic configuration changes. This would allow vehicles to adapt to changing conditions and customer needs in real-time, without the need for physical hardware upgrades or manual intervention by the user. Overall, these trends towards more flexible and expandable vehicle-to-cloud communication systems have the potential to revolutionize the way we think about transportation and mobility, enabling vehicles that are more responsive to customer needs and better adapted to changing market demands.

Referring still to FIG. 2, the AWS IoT block 208 is configured to execute one or more rules to instruct a processor 212 to output the raw, unprocessed or non-manipulated collected vehicle data to a replay storage block 236 (e.g., a memory), to output an object (e.g., a JavaScript Object Notation, or JSON object) with data mapped to signals, or both. The object, when processed and output, could be provided to, for example, a Dynamo database (DynamoDB) block 216, a Firehose block 220 (which is then pushed to a Simple Storage Service, or “S3” block 224), and/or a Data Stream block 228 (which is then pushed to consumer devices 232, such as vehicles or mobile computing devices). The storage of the raw collected vehicle data in the replay storage block 236 is one key aspect of the present invention. After storing this raw collected vehicle data, it is preserved for future access and usage.

As part of the techniques of the present application, this includes retrieval by a playback engine 240, which retrieves the collected vehicle data and provides the collected vehicle data back to the AWS IoT block 208 in the same manner (sequence, timing, etc.) as originally provided by the OEM vehicle 104. As such, the collected vehicle data being provided by the playback engine 240 to the AWS IoT block 208 appears as if the OEM vehicle 104 is currently operating in real-time in an on-road environment. This could be performed using the collected vehicle data for one OEM vehicle 104 or a plurality of OEM vehicles 104, which would then enable an OEM or third party software application developer (e.g., application developer 116 of FIG. 1) to test and verify or validate their application software code without having access to an actual OEM vehicle operating in a real-time and in an on-road environment. This will allow for improved vehicle application software development by reducing development time, costs, and complexity and increasing the availability of high quality vehicle software applications and thereby improving the customer experience for those owning vehicles manufactured and sold by the OEM.

Figure 3:
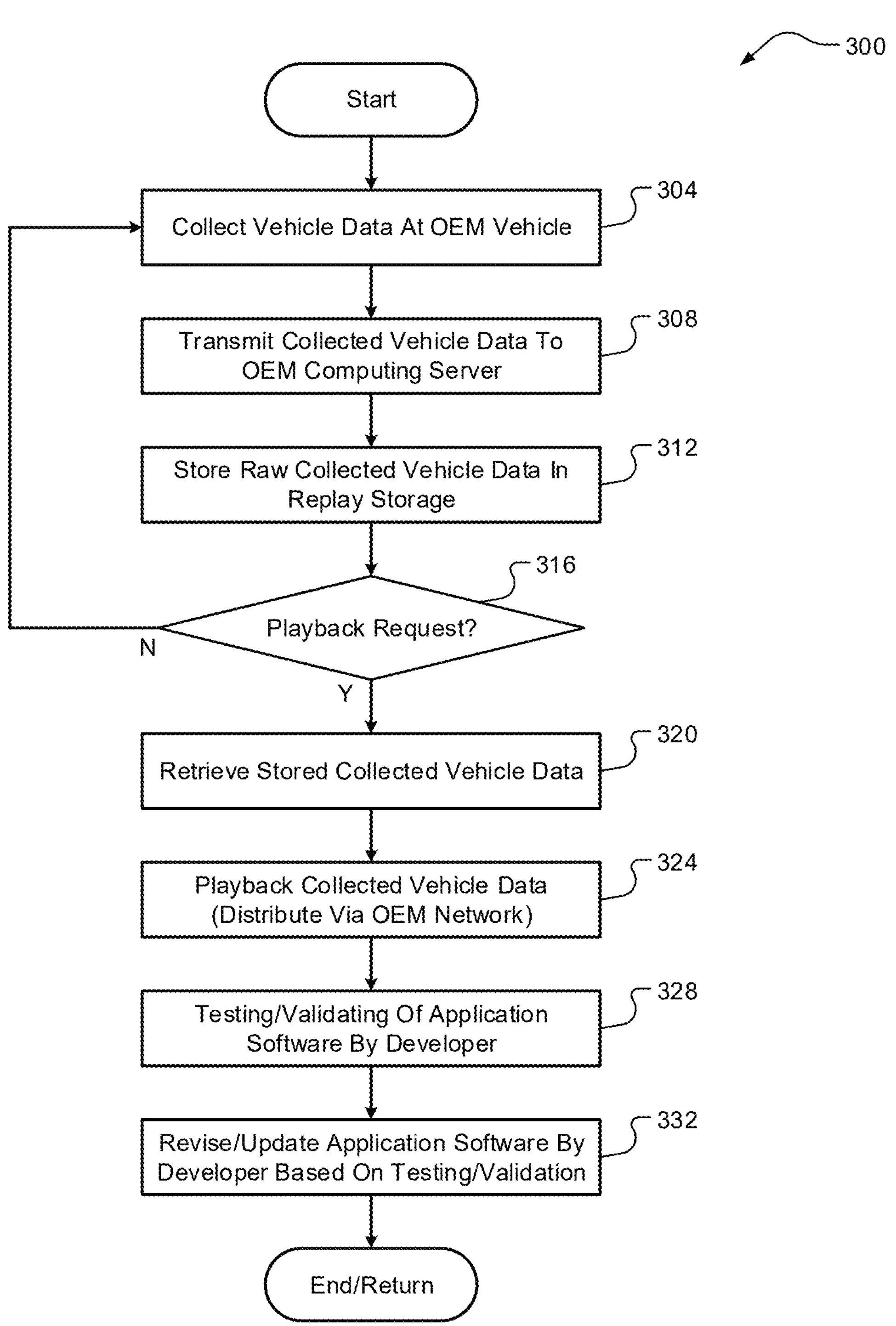
FIG. 3 is a flow diagram of an example cloud-based vehicle data capture/replay and vehicle software application development method according to the principles of the present application.

Referring now to FIG. 3, a flow diagram of an example cloud-based vehicle data capture/replay and vehicle software application development method 300 according to the principles of the present application is illustrated. While the method 300 specifically references systems 100, 200 of FIGS. 1-2 and their components, it will be appreciated that this method 300 could be applicable to any suitable vehicle network architecture. The method 300 begins at 304. At 304, the controller 120 (e.g., the ADA client 204) of the OEM vehicle 104 collects vehicle data. At 308, the OEM vehicle 104 transmits the collected vehicle data (e.g., in an encrypted V2C format) to the OEM computing server 108. These steps 304-308 could be continuously executing at each OEM vehicle 104 during their powered-up operation. At 312, the OEM computing server 108 stores the raw collected vehicle data (e.g., in the replay storage block 246). At 316, the OEM computing server 108 determines whether a playback request has been received (e.g., from an application developer 116). When false, the method 300 ends or returns to 304 or to 312. When true, the method 300 proceeds to 316. At 320, the OEM computing server 108 retrieves the collected vehicle data from the storage/memory. At 324, the OEM computing server 108 plays back the collected vehicle data by distributing it via the network 112 (e.g., back to the AWS IoT block 208) such that it appears that the OEM vehicle 104 is currently operating on the road in real-time. At 328, the application developer 116 tests or verifies/validates their vehicle application software using the collected vehicle data in real-time. At 332, the application developer 116 updates their vehicle application software based on the testing/validation and without having access to an actual OEM vehicle. The method 300 then ends.

It will be appreciated that the terms “controller,” “control system,” and “computing server” as used herein refer to any suitable control or computing device or set of multiple control or computing devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller/control system/computing server to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A cloud-based vehicle data capture and replay system, the cloud-based vehicle data capture and replay system comprising:

a controller of an original equipment manufacturer (OEM) vehicle, the controller being configured to monitor and collect vehicle data including real-time signals indicative of operating conditions of the OEM vehicle during a defined collection period; and an OEM computing server configured to:

receive, from the OEM vehicle, the collected vehicle data for the OEM vehicle;

store the collected vehicle data for the OEM vehicle;

receive, from a software developer as part of development and testing of a vehicle software application for one or more OEM vehicles, a request to replay the collected vehicle data for the OEM vehicle; and in response to receiving the request, replay the collected vehicle data for the OEM vehicle by distributing the collected vehicle data in a cloud-based OEM communication network, wherein the distribution of the collected vehicle data for the OEM vehicle in the cloud-based OEM communication network appears as if the OEM vehicle is operating in real-time for use by the software developer in the development and testing of the vehicle software application.

2. The cloud-based vehicle data capture and replay system of claim 1, wherein the collected vehicle data for the OEM vehicle includes raw, unprocessed, or non-manipulated real-time signals indicative of operating conditions of the OEM vehicle during the defined collection period.

3. The cloud-based vehicle data capture and replay system of claim 2, wherein the OEM computing server is further configured to execute a playback engine that retrieves the stored collected vehicle data and distributes it in a same sequence and timing over the defined collection period.

4. The cloud-based vehicle data capture and replay system of claim 1, wherein the request is received by the OEM computing server and the collected vehicle data for the OEM vehicle is distributed in the cloud-based OEM communication network during a period where the OEM vehicle is not operating.

5. The system of claim 4, wherein the request is provided by an OEM developer and the vehicle software application is an OEM vehicle software application.

6. The cloud-based vehicle data capture and replay system of claim 4, wherein the request is provided by a third-party developer and the vehicle software application is a third-party vehicle software application.

7. The cloud-based vehicle data capture and replay system of claim 6, wherein the third-party developer does not have access to the OEM vehicle or another OEM vehicle.

8. The cloud-based vehicle data capture and replay system of claim 1, wherein the OEM computing server is configured to distribute the collected vehicle data for the OEM vehicle via one of (i) an OEM application program interface (API) and (ii) an OEM web-based platform.

9. The cloud-based vehicle data capture and replay system of claim 1, wherein the collected vehicle data is a continuous data stream, for the defined collection period, of the real-time signals indicative of operating conditions of the OEM vehicle.

10. The cloud-based vehicle data capture and replay system of claim 9, wherein the OEM computing server is further configured to replay the collected vehicle in the cloud-based OEM communication network by streaming the continuous data stream on the cloud-based OEM communication network.

11. A cloud-based vehicle data capture and replay method, the method comprising:

monitoring and collecting, by a controller of an original equipment manufacturer (OEM) vehicle, vehicle data including real-time signals indicative of operating conditions of the OEM vehicle during a defined collection period;

receiving, by an OEM computing server and from the OEM vehicle, the collected vehicle data for the OEM vehicle;

storing, by the OEM computing server, the collected vehicle data for the OEM vehicle;

receiving, by the OEM computing server and from a software developer as part of development and testing of a vehicle software application for one or more OEM vehicles, a request to replay the collected vehicle data for the OEM vehicle; and in response to receiving the request, replaying, by the OEM computing server, the collected vehicle data for the OEM vehicle by distributing the collected vehicle data in a cloud-based OEM communication network, wherein the distribution of the collected vehicle data for the OEM vehicle in the cloud-based OEM communication network appears as if the OEM vehicle is operating in real-time for use by the software developer in the development and testing of the vehicle software application.

12. The method of claim 11, wherein the collected vehicle data for the OEM vehicle includes raw, unprocessed, or non-manipulated real-time signals indicative of operating conditions of the OEM vehicle during the defined collection period the collected vehicle data for the OEM vehicle.

13. The method of claim 12, further comprising executing, by the OEM computing server, a playback engine that retrieves the stored collected vehicle data and distributes it in a same sequence and timing over the defined collection period.

14. The method of claim 11, wherein the request is received by the OEM computing server and the collected vehicle data for the OEM vehicle is distributed in the cloud-based OEM communication network during a period where the OEM vehicle is not operating.

15. The method of claim 14, wherein the request is provided by an OEM developer and the vehicle software application is an OEM vehicle software application.

16. The method of claim 14, wherein the request is provided by a third-party developer and the vehicle software application is a third-party vehicle software application.

17. The method of claim 16, wherein the third-party developer does not have access to the OEM vehicle or another OEM vehicle.

18. The method of claim 11, wherein the distribution of the collected vehicle data for the OEM vehicle is performed by the OEM computing server via one of (i) an OEM application program interface (API) and (ii) an OEM web-based platform.

19. The method of claim 11, wherein the collected vehicle data is a continuous data stream, for the defined collection period, of the real-time signals indicative of operating conditions of the OEM vehicle.

20. The method of claim 19, wherein the replaying of the collected vehicle data for the OEM vehicle includes streaming, by the OEM computing server, the continuous data stream on the cloud-based OEM communication network.

* * * * *